United States Patent [19]

Ishikawa et al.

[11] Patent Number: 4,953,021
[45] Date of Patent: Aug. 28, 1990

[54] DEMODULATOR CIRCUIT FOR TELEVISION MULTI-CHANNEL

[75] Inventors: Tsutomu Ishikawa; Akira Kabashima, both of Ota; Hideo Imaizumi, Gunma, all of Japan

[73] Assignee: Sanyo Electric Co., Ltd., Osaka, Japan

[21] Appl. No.: 472,459

[22] Filed: Feb. 1, 1990

Related U.S. Application Data

[63] Continuation of Ser. No. 181,477, Apr. 14, 1988, abandoned.

[30] Foreign Application Priority Data

Apr. 17, 1987 [JP] Japan ................................ 62-95578
Apr. 20, 1987 [JP] Japan ............................ 62-59436[U]
May 20, 1987 [JP] Japan ............................... 62-123330

[51] Int. Cl.$^5$ .............................................. H04N 7/04
[52] U.S. Cl. ..................................... 358/144; 358/143; 358/198
[58] Field of Search ............... 358/144, 143, 198, 167; 381/13

[56] References Cited

U.S. PATENT DOCUMENTS 4,405,944 9/1983 Eiters et al. ...................... 358/144
4,680,793 7/1987 Sugai et al. ......................... 381/13
4,723,287 2/1988 Tobita et al. ....................... 358/144

OTHER PUBLICATIONS

Fockens et al., "Intercarrier Buzz Phenomena and Cures", IEEE Transactions on Consumer Electronics, vol. CE-27, #3, pp. 381-393, 8/81.
Television Journal, "Buzz-Beat Interference in Multi--Sound Television Receivers", Murakami et al., vol. 26, No. 6, 1972, pp. 459-467.
NEC, "Decoder System ICs for US Multichannel TV Sound", Fukaya et al., vol. 39, No. 3, 1986, pp. 4-8.

Primary Examiner—James J. Groody
Assistant Examiner—David E. Harvey
Attorney, Agent, or Firm—Armstrong, Nikaido, Marmelstein, Kubovcik & Murray

[57] ABSTRACT

A multi-channel sound signal received and detected in a TV receiver includes a main channel signal comprising a stereo sum (L+R) signal, a stereo pilot signal having a frequency of $f_H$ equal to the frequency of a horizontal synchronizing signal, and a sub-channel signal obtained by DSB modulation of a sub-carrier having a frequency of $2f_H$ by a stereo difference (L−R) signal. In a TV multi-channel sound signal demodulator circuit, the sub-carrier is reproduced by a PLL circuit in response to the stereo pilot signal, to demodulate the stereo difference (L−R) signal using the sub-carrier. The stereo difference signal thus demodulated includes a 60Hz noise component due to interference between a sound signal and a video signal. However, the noise component is removed by a high-pass filter provided between a sub-channel signal demodulator circuit and a matrix circuit. Thus, right and left stereo signals R and L outputted from the matrix circuit do not include a noise component.

27 Claims, 5 Drawing Sheets

DEMODULATOR CIRCUIT FOR TELEVISION MULTI-CHANNEL

This application is a continuation of application Ser. No. 181,477 filed Apr. 14, 1988 now abandoned.

BACKGROUND OF THE INVENTION

1. Field of the Invention

The present invention relates to a demodulator circuit for a television multi-channel sound signal (referred to as TV multi-channel sound signal hereinafter) and more particularly, to a TV multi-channel sound signal demodulator circuit in which a noise component included in a sub-channel signal constituting a TV multi-channel sound signal can be removed.

2. Description of the Prior Art

According to a TV multi-channel sound broadcasting system currently employed in the U.S., a TV multi-channel sound signal comprises a main channel signal, a stereo pilot signal, a sub-channel signal, a second sound signal and the like, which are frequency-multiplexed. More specifically, in the case of, for example, stereophonic broadcasting, the main channel signal comprises a stereo sum (L+R) signal of the audio band (50 Hz to 15 KHz). The above described stereo pilot signal is set to have a frequency equal to the frequency $f_H$ (15.734 KHz) of a horizontal synchronizing signal of a TV signal. In addition, the above described sub-channel signal comprises a signal obtained by DSB (double sideband) modulation of a sub-carrier having a frequency of $2f_H$ (31.468 KHz) by a stereo difference (L−R) signal (50 Hz to 15 KHz). A sound carrier of the TV broadcasting signal is frequency-modulated by the TV multi-channel sound signal obtained by frequency-multiplexing the main channel signal, the stereo pilot signal, the sub-channel signal and the like, to be transmitted.

On the other hand, on the receiving side of the TV signal, the TV multi-channel sound signal is extracted from the frequency-modulated sound carrier as received by an IF (intermediate frequency) detector circuit in a TV receiver. The stereo pilot signal of frequency $f_H$ in the extracted TV multi-channel sound signal is applied to a PLL (phase locked loop) circuit provided in a demodulator circuit in the TV receiver, so that the sub-carrier of frequency $2f_H$ is reproduced. The stereo difference (L−R) signal is demodulated from the sub-channel signal in the above described extracted TV multi-channel sound signal using this reproduced sub-carrier. Finally, the demodulated stereo difference (L−R) signal and the stereo sum (L+R) signal of the main channel signal in the above described extracted TV multi-channel sound signal are matrixed, so that right and left stereo signals R and L are reproduced.

The above described demodulator circuit for the TV multi-channel sound signal in the U.S. is disclosed in, for example, an article by H. Fukaya et al., entitled "Decoder System ICs for US Multichannel TV Sound", NEC TECHNICAL JOURNAL, Japanese publication issued on Mar. 5, 1986, Vol. 39, No. 3, pp. 4–7.

In general, in the TV receiver, a sound signal is obtained by extracting an FM signal from a received TV signal and FM-detecting the same. As a method for extracting such a sound FM signal, generally, a method for extracting a sound FM signal from a video detection output from a video detector circuit, i.e., an inter carrier system or a method for separately detecting a video signal and a sound signal, i.e., a split carrier system can be used. More specifically, in the split carrier system, since a video and a sound are separated and independently detected, there is little effect of the video signal on the sound signal after detection. On the other hand, in the inter carrier system, since a beat signal of 4.5 MHz, i.e., the frequency corresponding to the difference between frequencies of a video carrier and a sound carrier produced in the detection output when the video signal is detected, is used as a sound FM signal, the obtained sound FM signal may be subjected to abnormal modulation by the video signal due to interference between the video signal and the sound signal.

Particularly, in the TV multi-channel sound broadcasting system in the U.S., since frequencies of the stereo pilot signal and the sub-channel sub-carrier are selected to be $f_H$ and $2f_H$, respectively, as described above, interference with respect to the same channel occurs between a horizontal synchronizing signal in the received video signal and the stereo pilot signal and between a second harmonic (31.5 KHz) of the horizontal synchronizing signal and the sub-carrier, so that grating noise referred to as a so-called buzz sound is produced in the reproduced sound output. The principle of generation of such a buzz sound is described in, for example, an article by T. Murakami et al., entitled "Buzz-Beat Interference in Multi-Sound Television Receivers", Japanese publication "Television", Vol. 26, No. 6, 1972, pp. 459–467.

More specifically, in the above described multi-channel sound signal demodulator circuit in which the sub-carrier of $2f_H$ is reproduced in response to the stereo pilot signal of $f_H$ by the PLL circuit and the stereo difference (L−R) signal is demodulated from the sub-channel signal using this sub-carrier, the stereo pilot signal of $f_H$ in the sound signal is subjected to abnormal modulation by the horizontal synchronizing signal of $f_H$ in the video signal due to the above described interference in the detector circuit.

FIG. 1 is a waveform diagram for explaining modulation of the stereo pilot signal of $f_H$ by the horizontal synchronizing signal of $f_H$. More specifically, FIG. 1(a) schematically illustrates a synchronizing signal including a horizontal synchronizing signal and a vertical synchronizing signal, FIG. 1(b) shows an original stereo pilot signal of $f_H$ and FIG. 1(c) shows a stereo pilot signal in which phase distortion is caused due to the effect of the horizontal synchronizing signal mixed in the sound signal in the detector circuit.

As a result of such phase distortion of the stereo pilot signal, a phase shift occurs in the PLL circuit. Thus, the sub-carrier of $2f_H$ out of phase is applied to a sub-channel demodulator circuit. The demodulation level of the stereo difference (L−R) signal output from the sub-channel demodulator circuit changes depending on the above described phase shift. If the above described interference between the horizontal synchronizing signal and the stereo pilot signal always occurs, the phase shift of the sub-carrier is constant. Thus, the demodulation efficiency of the stereo difference (L−R) signal is also constant, resulting in no problem. However, the synchronizing signal in the TV signal includes a vertical synchronizing signal period (referred to as vertical period hereinafter) with a period of 1/60 seconds. There exists no horizontal synchronizing signal in the vertical period. Consequently, the stereo pilot signal is not affected by the horizontal synchronizing signal during the vertical period as shown in FIG. 1(c). Thus, the demodulation efficiency of the stereo difference (L−R) signal would differ in the horizontal period and the vertical period of the video signal. Considering this phenomenon from the reverse viewpoint, it seems that the generated sound signal is affected by the video signal only in the vertical period of the video signal.

FIG. 2 is a waveform diagram for explaining the above described phenomenon, where FIG. 2(a) schematically shows the situation where a stereo pilot signal of frequency $f_H$ applied to a PLL circuit is affected by the horizontal synchronizing signal of $f_H$, and FIG. 2(b) shows a demodulated stereo difference (L−R) signal output from a sub-channel demodulator circuit. In FIG. 2, the period A represents a vertical period and the period B represents a horizontal period. As shown in the above described FIG. 1(c) and FIG. 2(a), since in the vertical period A, the stereo pilot signal (a) is not affected by a horizontal synchronizing signal, the obtained stereo difference (L−R) signal (b) has a constant demodulation level. On the other hand, since in the horizontal period B, the pilot signal (a) is affected by the horizontal synchronizing signal, the demodulation level of the stereo difference (L−R) signal (b) changes. More specifically, since sub-carriers having different phases are applied to the sub-channel demodulator circuit with a frequency of 60 Hz, the demodulation level of the stereo difference (L−R) signal changes with the frequency of 60 Hz as shown in FIG. 2(b). More specifically, the portion corresponding to the period A of the stereo difference (L−R) signal as shown in FIG. 2(b) acts as a 60 Hz noise component. The stereo difference (L−R) signal is applied to a matrix circuit, to be used for reproducing right and left stereo signals R and L. However, since the stereo difference (L−R) signal includes the 60 Hz noise component as described above, 60 Hz noise is produced in the stereo signals R and L which are demodulation outputs of the matrix circuit.

Additionally, as described above, interference occurs between a second harmonic of a separately mixed horizontal synchronizing signal and a sub-carrier of $2f_H$. More specifically, due to such a second harmonic, the sub-carrier output from the PLL circuit is subjected to abnormal modulation. As a result the demodulated stereo difference (L−R) signal is subjected to a change in amplitude. Due to such a change in amplitude, the stereo difference (L−R) signal includes the 60 Hz noise component. In particular, the larger the amplitude of the horizontal synchronizing signal in the video signal is, the more easily the demodulation output is affected by phase distortion during the horizontal period, so that 60 Hz noise becomes significant. More specifically, when a luminance signal level, i.e., a white level of the video signal is high, the 60 Hz noise occurs conspicuously.

As described in the foregoing, in the conventional TV multi-channel sound signal demodulator circuit, 60 Hz noise is produced in the stereo difference (L−R) signal. Consequently, the 60 Hz noise and noise of the harmonic are mixed in the right and left stereo signals obtained by matrixing, so that a grating buzz sound is produced in the sound signal.

SUMMARY OF THE INVENTION

Therefore, a primary object of the present invention is to provide a TV multi-channel sound signal demodulator circuit in which generation of a buzz sound in a reproduced sound output can be controlled.

Another object of the present invention is to provide a TV multi-channel sound signal demodulator circuit in which the S/N ratio of reproduced right and left stereo signals can be improved by removing a noise component in a demodulated sub-channel signal.

Still another object of the present invention is to provide a TV multi-channel sound signal demodulator circuit in which a noise component in a sub-channel signal can be efficiently removed in response to a white level of a video signal.

Briefly stated, the TV multi-channel sound signal demodulator circuit according to the present invention comprises a receiver circuit for receiving a video signal and a multi-channel sound signal. The multi-channel sound signal comprises at least a main channel signal, an amplitude-modulated sub-channel signal and a stereo pilot signal which are frequency-multiplexed. A detector circuit detects the video signal and multi-channel sound signal which are received by the receiver circuit. A demodulation circuit demodulates the amplitude-modulated sub-channel signal in the multi-channel sound signal detected by the detector circuit. A matrixing circuit matrixes the main channel signal in the multi-channel sound signal detected by the detector circuit and the sub-channel signal demodulated by a sub-channel signal demodulator circuit. A noise removal circuit removes a noise component in the demodulated sub-channel signal.

In accordance with another aspect of the present invention, the TV multi-channel sound signal demodulator circuit further comprises a circuit for detecting a white level of a video signal detected by a detector circuit, and wherein a noise component removing circuit removes a noise component in a demodulated sub-channel signal in response to the detected white level.

Thus, a principal advantage of the present invention is that a noise component in a demodulated sub-channel signal can be removed and a buzz sound in a reproduced sound signal can be reduced by controlling characteristics of a circuit for removing noise in a sub-channel signal in response to a white level of a video signal.

Another advantage of the present invention is that a noise component can be efficiently removed depending on the degree of generation of noise by controlling characteristics of a circuit for removing noise in a sub-channel signal in response to a white level of a video signal.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
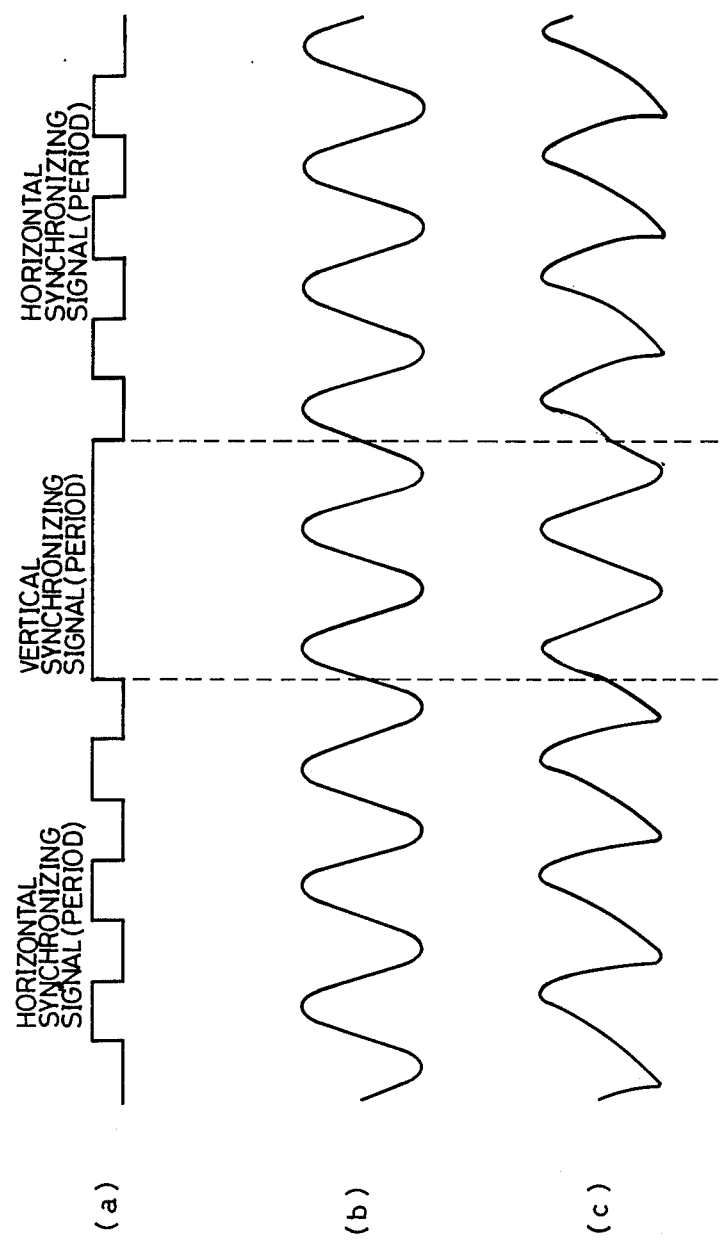
FIG. 1 is a waveform diagram for explaining modulation of a stereo pilot signal by a horizontal synchronizing signal.
Figure 2:
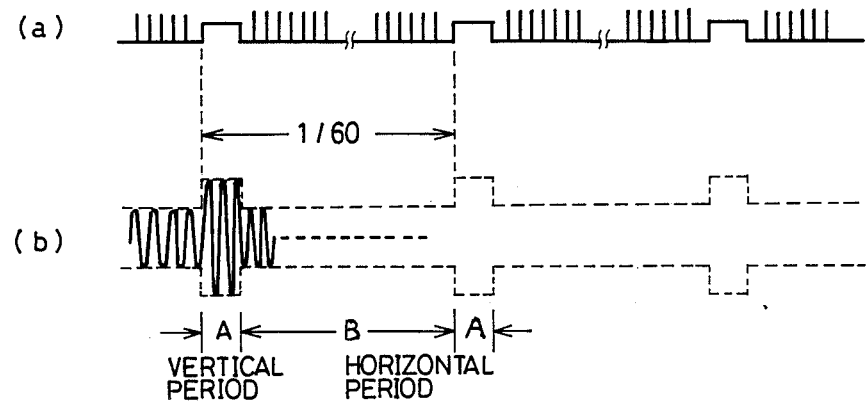
FIG. 2 is a waveform diagram for explaining the principle of generation of noise in an output of a sub-channel demodulator circuit.
Figure 3:
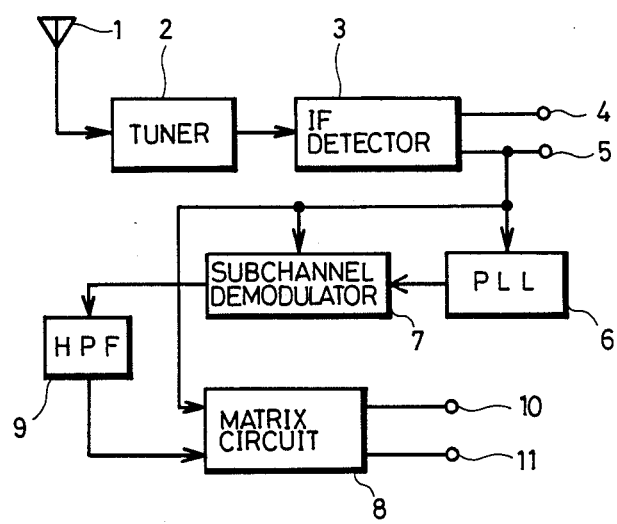
FIG. 3 is a block diagram showing a TV multi-channel sound signal demodulator circuit according to a first embodiment of the present invention.

FIG. 3 is a block diagram showing a TV multi-channel sound signal demodulator circuit according to a first embodiment of the present invention.

In FIG. 3, a television signal of RF (radio frequency) received by an antenna 1 is converted into an IF (intermediate frequency) signal by a tuner 2 and then, applied to an IF detector circuit 3, to be amplified and detected. A video signal and a multi-channel sound signal are derived from the IF detector circuit 3 through terminals 4 and 5, respectively. The multi-channel sound signal derived from the IF detector circuit 3 includes a main channel signal comprising a stereo sum (L+R) signal, a stereo pilot signal having a frequency of $f_H$, and a sub-channel signal comprising a signal obtained by DSB modulation of a sub-carrier having a frequency of $2f_H$ by a stereo difference (L−R) signal, as described above. The multi-channel sound signal is applied to a PLL circuit 6, a sub-channel demodulator circuit 7 and a matrix circuit 8. The PLL circuit 6 reproduces the sub-carrier of frequency $2f_H$ utilizing as a reference signal the stereo pilot signal of frequency $f_H$ in the applied multi-channel sound signal and applies the same to the sub-channel demodulator circuit 7. The sub-channel demodulator circuit 7 demodulates the stereo difference (L−R) signal from the sub-channel signal in the multi-channel sound signal using the above described sub-carrier from the PLL circuit 6 to output the same. This demodulated stereo difference (L−R) signal is applied to a high-pass filter circuit 9 for removing a 60 Hz component. The stereo difference (L−R) signal output from the sub-channel demodulator circuit 7 includes a 60 Hz noise component caused by interference between a video signal and a sound signal. However, this noise component is removed by the above described high-pass filter circuit 9, so that the original stereo difference (L−R) signal is applied to the matrix circuit 8. The matrix circuit 8 matrixes the stereo sum (L+R) signal in the multi-channel sound signal applied from the IF detector circuit 3 and the original stereo difference (L−R) signal including no noise component as described above to demodulate right and left stereo signals R and L. These demodulated right and left stereo signals R and L are output through terminals 10 and 11, respectively.

As described in the foregoing, according to a first embodiment of the present invention, since the high-pass filter circuit 9 for removing the 60 Hz component is inserted between the sub-channel demodulator circuit 7 and the matrix circuit 8, the 60 Hz noise component in the stereo difference (L−R) signal can be substantially reduced. Thus, production of noise in the right and left stereo signals R and L demodulated by the matrix circuit 8 can be significantly controlled.

According to the first embodiment shown in FIG. 3, when the high-pass filter circuit is inserted into a signal path of the stereo difference (L−R) signal, the stereo difference (L−R) signal itself is partially reduced, so that stereo separation in a low frequency band of a reproduced sound signal is liable to be slightly deteriorated. In general, since the effect of the stereo sum (L+R) signal on a low frequency component in the stereo signal is predominant, the practical effect due to such partial reduction of the stereo difference (L−R) signal is relatively slight. Considering the effect of substantial reduction of a buzz sound caused by the 60 Hz noise component, the above described deterioration of stereo separation is not a serious problem.

Figure 4:
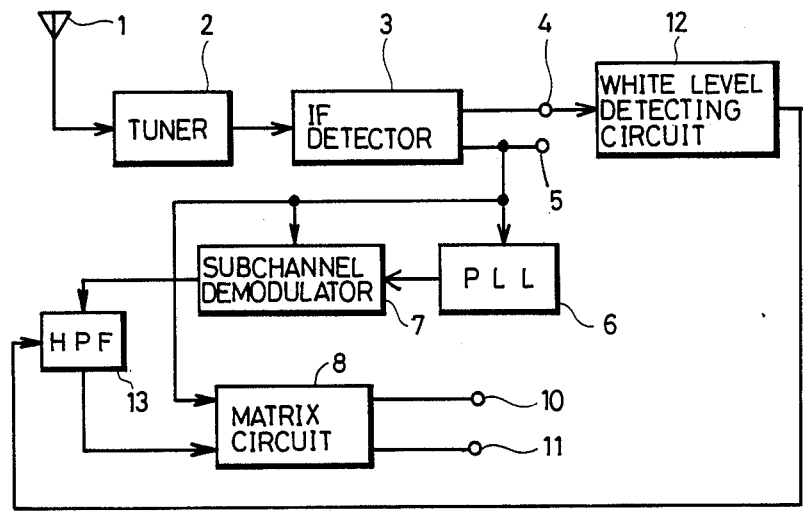
FIG. 4 is a block diagram showing a TV multi-channel sound signal demodulator circuit according to a second embodiment of the present invention.

However, in order to further improve the reproduced sound signal, deterioration of such a channel separation should be prevented. Therefore, the second embodiment shown in FIG. 4 is intended to solve such a problem by removing the above described 60 Hz noise component more efficiently. More specifically, the second embodiment of the present invention is intended to control characteristics of a filter circuit for removing the 60 Hz component in response to the white level of the video signal and more effectively remove the 60 Hz noise component in view of the fact that the higher the white level (luminance signal level) of the video signal is, the more significant generation of the 60 Hz noise in the stereo difference (L−R) signal becomes.

The second embodiment shown in FIG. 4 is the same as the first embodiment shown in FIG. 3 except for the following. More specifically, there are provided a white level detecting circuit 12 for detecting a white level of a video signal output from an IF detector circuit 3 through a terminal 4 and a high-pass filter circuit 13 for removing a 60 Hz component inserted between a sub-channel demodulator circuit 7 and a matrix circuit 8. Filter characteristics of the high-pass filter circuit 13 are controlled by a detection output of the white level detecting circuit 12.

Figure 5:
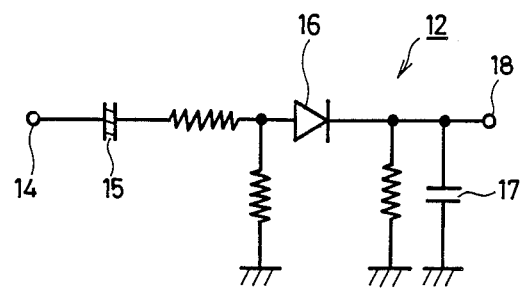
FIG. 5 is a circuit diagram showing an example of a white level detecting circuit shown in FIG. 4.

FIG. 5 is a circuit diagram showing an example of such a white level detecting circuit 12. In FIG. 5, a video signal is applied from the terminal 4 shown i FIG. 4 to an input terminal 14 of the white level detecting circuit 12. After the DC component of the applied video signal is removed by a DC component removing capacitor 15, the video signal with the DC component removed is applied to a diode 16, so that only a positive signal component is detected. Charges corresponding to the detected positive signal component is applied to a capacitor 17 for charging. When the white level of the video signal is close to a reference white level, the amplitude of a horizontal synchronizing signal in the video signal becomes large, so that a terminal voltage of the capacitor 17 rises. On the other hand, when the white level is very different from the reference white level, the amplitude of the horizontal synchronizing signal becomes small, so that the terminal voltage of the capacitor 17 is lowered. Thus, a voltage corresponding to the white level of the video signal is generated at an output terminal 18 of the white level detecting circuit 12.

The high-pass filter circuit 13 inserted between the sub-channel demodulator circuit 7 and the matrix circuit 8 removes a 60 Hz noise component included in a stereo difference (L−R) signal, similarly to the high-pass filter circuit 9 shown in FIG. 3. However, the level of this noise changes depending on the white level of the video signal. Therefore, a third embodiment is intended to remove noise more efficiently by controlling filter characteristics of the high-pass filter circuit 13 in response to the detection output of the white level detecting circuit 12.

Figure 6:
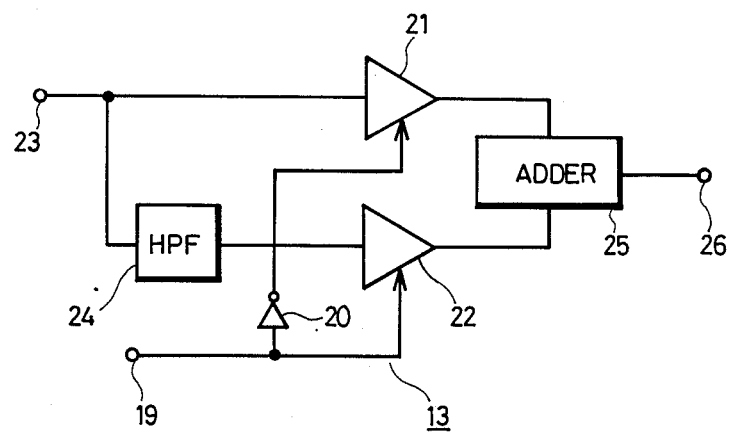
FIG. 6 is a circuit diagram showing an example of a filter circuit shown in FIG. 4.

FIG. 6 is a circuit diagram showing an example of a filter circuit in which such filter characteristics can be controlled. In FIG. 6, a voltage corresponding to the white level of the video signal is applied from the output terminal 18 of the white level detecting circuit 12 shown in FIG. 5 to a control terminal 19 of the filter circuit 13. The applied voltage is inverted by an inverter 20 and applied to a control input of a first voltage control amplifier (VCA) 21 while being applied to a control input of a second VCA 22 without being inverted. On the other hand, the stereo difference (L−R) signal from the sub-channel demodulator circuit 7 shown in FIG. 4 is applied to an input terminal 23 of the filter circuit 13. The applied stereo difference (L−R) signal is directly applied to an input of the first VCA 21 while being applied to an input of the second VCA 22 through a high-pass filter 24 for removing the 60 Hz component. Outputs of the first and second VCAs 21 and 22 are added by an adder 25. The added output is output through a terminal 26 and applied to one input of the matrix circuit 8.

When the white level of the video signal is high, an output signal of "H" level is applied to the control terminal 19 from the white level detecting circuit 12. Then, signals of "L" and "H" levels are applied to the control inputs of the first and second VCAs 21 and 22, respectively. Consequently, the first VCA 21 is turned off while the second VCA 22 is turned on. As a result, after the 60 Hz component of the stereo difference (L−R) signal input through the input terminal 23 is removed by the high-pass filter 24, the stereo difference (L−R) signal with the 60 Hz component removed is output 31 from the terminal 26 through the second VCA 22 and the adder 25.

On the other hand, when the white level of the video signal is low, the output signal of "L" level is applied to the control terminal 19 from the white level detecting circuit 12. Then, signals of "H" and "L" levels are applied to the control inputs of the first and second VCAs 21 and 22, respectively. Consequently, the first VCA 21 is turned on while the second VCA 22 is turned off. As a result, the stereo difference (L−R) signal input through the input terminal 23 is directly output from the terminal 26 through the first VCA 21 and the adder 25.

Additionally, when the white level of the video signal is between the above described "H" and "L" levels, an output signal corresponding thereto is applied to the control terminal 19 from the white level detecting circuit 12. Then, gains of the first and second VCAs 21 and 22 change in response to the level of the applied signal, so that the mixture ratio of the respective outputs in the adder 25 is controlled. Thus, the noise reduction rate of the stereo difference (L−R) signal output from the terminal 26 depends on the output level of the white level detecting circuit 12. Although in the filter circuit 13 shown in FIG. 6, the signal level after passage through the high-pass filter 24 is adjusted to substantially adjust characteristics of the filter circuit 13, the time constant of the high-pass filter 24 itself may be changed in response to the output signal level of the white level detecting circuit 12, in which case the same effect can be obtained.

As described in the foregoing, according to the second embodiment of the present invention shown in FIGS. 4 to 6, since the white level of the video signal is detected to responsively control characteristics of the filter circuit inserted into a pass of the sub-channel signal, 60 Hz noise can be efficiently removed by the filter circuit when the 60 Hz noise is significantly produced. Thus, a buzz sound in the reproduced sound signal can be significantly controlled with minimum deterioration of stereo separation.

Figure 7:
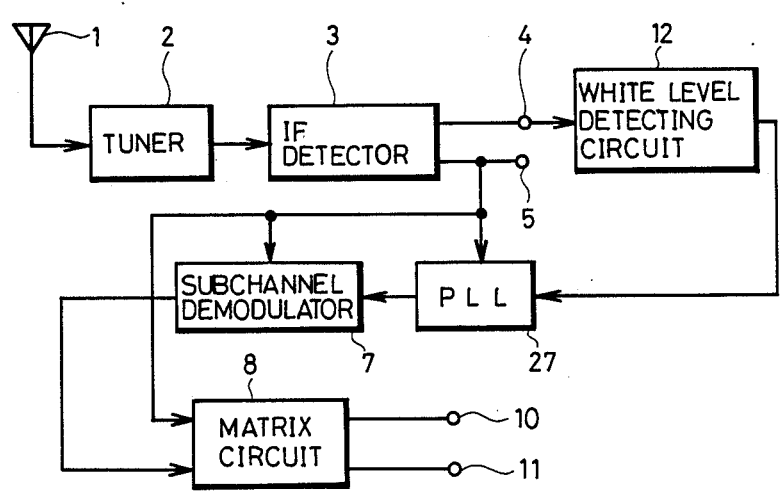
FIG. 7 is a block diagram showing a TV multi-channel sound signal demodulator circuit according to a third embodiment of the present invention.

FIG. 7 is a block diagram showing a TV multi-channel sound signal demodulator circuit according to a third embodiment of the present invention. The third embodiment shown in FIG. 7 is the same as the second embodiment shown in FIG. 4 except for the following. More specifically, according to the embodiment shown in FIG. 7, a signal path between a sub-channel demodulator circuit 7 and a matrix circuit 8 does not include a high-pass filter circuit, so that a stereo difference (L−R) signal output from the sub-channel signal demodulator circuit 7 is directly applied to one input of the matrix circuit 8. On the other hand, a signal outputted from a white level detecting circuit 12 is applied to a PLL circuit 27, to be used for controlling the time constant of a low-pass filter as described below included therein. More specifically, the embodiment shown in FIG. 7 is intended to reduce the phase shift of a sub-carrier output from the PLL circuit 27 by increasing the time constant of the low-pass filter contained in the PLL circuit 27 and controlling response of the PLL circuit 27 to an abrupt change in input signal when a white level of the video signal is high and a stereo pilot signal applied to the PLL circuit 27 from an IF detector circuit 3 is subjected to abnormal modulation.

More specifically, the time constant of the low-pass filter contained in the PLL circuit 27 is essentially set to a suitable value depending on the frequency $f_H$ of the stereo pilot signal in a multi-channel sound signal applied from the IF detector circuit 3. Thus, when the stereo pilot signal is not relatively affected by a horizontal synchronizing signal of frequency $f_H$ in the video signal, a sub-carrier of frequency $2f_H$ is correctly reproduced by the time constant set as described above. However, when the white level of the video signal becomes high and the stereo pilot signal is subjected to abnormal modulation, the phase shift in the PLL circuit becomes large if the time constant set as described above is maintained. As a result, the sub-carrier out of phase is reproduced.

In order to reduce such a phase shift in the PLL circuit, it is necessary that the time constant of the low-pass filter contained therein is made sufficiently high when the white level of the video signal becomes high so that the PLL circuit does not respond to the abrupt change in input signal. According to the third embodiment of the present invention, the time constant of such a low-pass filter is large in the period during which the white level is high while being small in the period during which it is low, to prevent the phase shift of the sub-carrier of $2f_H$ to be reproduced. As a result, in the sub-channel demodulator circuit 7, the stereo difference (L−R) signal can be always demodulated at a constant level, so that occurrence of the 60 Hz noise component in the stereo difference (L−R) signal is controlled.

Figure 8:
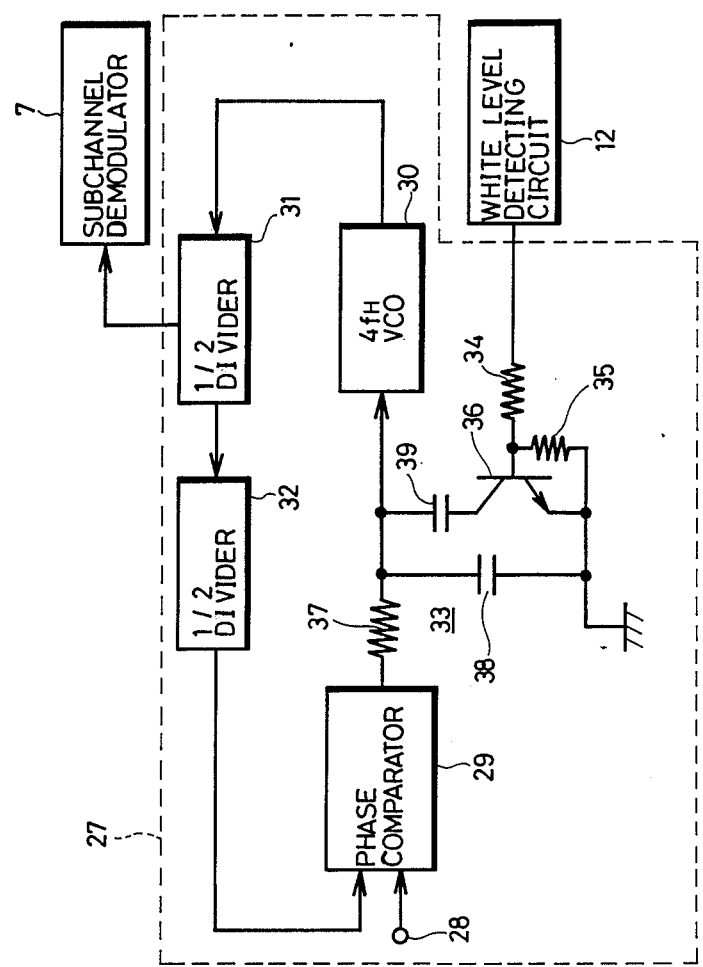
FIG. 8 is a circuit diagram showing an example of a PLL circuit shown in FIG. 7.

FIG. 8 is a circuit diagram showing an example of such a PLL circuit 27. In FIG. 8, a stereo pilot signal of a frequency $f_H$ is applied from the IF detector circuit 3 shown in FIG. 7 to an input terminal 28 of the PLL circuit 27. The applied stereo pilot signal is input to one input terminal of a phase comparator circuit 29. In addition, a signal of frequency $f_H$ obtained by frequency-dividing an oscillation output signal of frequency $4f_H$ of a voltage control oscillator (VCO) 30 by first and second ½ frequency dividers 31 and 32 is applied to the other input of the phase comparator circuit 29. The phase comparator circuit 29 compares the phases of the applied both input signals and outputs an error voltage corresponding to the phase difference. The error voltage, the high frequency component of which is removed by a low-pass filter 33, is applied to the VCO 30, so that the oscillation frequency of the VCO 30 is responsively controlled. Therefore, the oscillation output signal of frequency $4f_H$ of the VCO 30 is synchronized with the stereo pilot signal of frequency $f_H$, so that a sub-carrier of $2f_H$ is obtained from the first frequency divider 31 for frequency-dividing into ½ the oscillation output signal of the VCO 30. The sub-carrier obtained from the first frequency divider 31 is applied to the sub-channel demodulator circuit 7.

On the other hand, a detection signal from the white level detecting circuit 12 is voltage-divided by resistors 34 and 35 and then, applied to a base of a transistor 36. If the values of the resistors 34 and 35 are set such that the voltage divided by the resistors 34 and 35 when the white level of the video signal is lower than a predetermined level is equal to or less than a voltage $V_{BE}$ between the base and an emitter of the transistor 36, the transistor 36 is turned off when the white level is decreased to the predetermined level or less. In this case, the time constant of the low-pass filter 33 is determined by the values of a resistor 37 and a capacitor 38. In addition, when the white level is increased to the predetermined level or more the transistor is turned on. In this case, the time constant of the transistor 33 becomes a large value determined by the resistor 37 and the capacitors 38 and 39. More specifically, in the PLL circuit 27 shown in FIG. 8, the time constant of the low-pass filter 33 can be changed in response to a detection output of the white level of the video signal. Thus, according to the third embodiment shown in FIGS. 7 and 8, when the white level of the video signal becomes high, the time constant of the low-pass filter contained in the PLL circuit is increased to prevent the phase shift of the sub-carrier to be reproduced, so that generation of noise in the demodulated stereo difference (L−R) signal can be substantially reduced.

Although in the PLL circuit 27 shown in FIG. 8, the time constant of the low-pass filter 33 is controlled by connecting and disconnecting the capacitor 39 in parallel with the low-pass filter 33, it should be noted that control of the time constant of the low-pass filter according to the present invention is not limited to such structure. Any circuit having a variable time constant, for example, circuit having a continuously variable time constant, may be employed, in which case the same effect can be obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A television multi-channel sound signal demodulator circuit comprising:
    receiving means for receiving a video signal and a multi-channel sound signal, said multi-channel sound signal comprising at least a main channel signal, an amplitude-modulated sub-channel signal and a stereo pilot signal which are frequency multiplexed;
    detecting means for detecting said video signal and multi-channel sound signal which are received by said receiving means;
    sub-channel signal demodulating means for demodulating only said amplitude-modulated sub-channel signal of the multi-channel sound signal detected by said detecting means and for outputting a demodulated subchannel signal;
    matrixing means for matrixing said main channel signal of the multi-channel sound signal detected by said detecting means and said demodulated sub-channel signal from said sub-channel signal demodulating means; and
    noise component removing means for removing a noise component in only said demodulated sub-channel signal, said noise component removing means being a high-pass filter.

2. A television multi-channel sound signal demodulator circuit according to claim 1, wherein said high-pass filter
    being inserted between said sub-channel signal demodulating means and said matrixing means.

3. A television multi-channel sound signal demodulator circuit according to claim 1, wherein
    said sub-channel signal is amplitude-modulated using a sub-carrier having a frequency associated with the frequency of said stereo pilot signal, and
    said sub-channel signal demodulating means comprises means responsive to said stereo pilot signal in the multi-channel sound signal detected by said detecting means for reproducing said sub-carrier to demodulate said sub-channel signal.

4. A television multi-channel sound signal demodulator circuit according to claim 3, wherein said
    high-pass filter being inserted between said sub-channel signal demodulating means and said matrixing means.

5. A television multi-channel sound signal demodulator circuit according to claim 4, wherein
    said stereo pilot signal has a frequency equal to the frequency of a horizontal synchronizing signal in said video signal, and
    said sub-carrier is set to have a frequency which is twice the frequency of said stereo pilot signal.

6. A television multi-channel sound signal demodulator circuit according to claim 5, wherein
    said high-pass filter removes a 60 Hz component.

7. A television multi-channel sound signal demodulator circuit according to claim 1, which further comprises means for detecting a white level of the video signal detected by said detecting means, and wherein
    said noise component removing means removes a noise component in said demodulated sub-channel signal in response to said detected white level.

8. A television multi-channel sound signal demodulator circuit according to claim 7, wherein said noise component removing means comprises
    filtering means inserted between said sub-channel signal demodulating means and said matrixing means and having filter characteristics which change in response to said detected white level.

9. A television multi-channel sound signal demodulator circuit according to claim 8, wherein said filtering means comprises
    a filter for removing the noise component in said demodulated sub-channel signal, and
    means for mixing said demodulated sub-channel signal and a sub-channel signal obtained by removing the noise component through said filter, in the mixture ratio corresponding to said detected white level.

10. A television multi-channel sound signal demodulator circuit according to claim 8, wherein
said sub-channel signal is amplitude-modulated using a sub-carrier having a frequency associated with the frequency of said stereo pilot signal, and
said sub-channel signal demodulating means comprises means responsive to said stereo pilot signal in the multi-channel sound signal detected by said detecting means for reproducing said sub-carrier to demodulate said sub-channel signal.

11. A television multi-channel sound signal demodulator circuit according to claim 10, wherein
said stereo pilot signal has a frequency equal to the frequency of a horizontal synchronizing signal in said video signal, and
said sub-carrier is set to have a frequency which is twice the frequency of said stereo pilot signal.

12. A television multi-channel sound signal demodulator circuit according to claim 11, wherein
said filtering means comprises a high-pass filter for removing a 60 Hz component.

13. A television multi-channel sound signal demodulator circuit according to claim 7, wherein
said sub-channel signal is amplitude-modulated using a sub-carrier having a frequency associated with the frequency of said stereo pilot signal,
said sub-channel signal demodulating means comprises means responsive to said stereo pilot signal in the multi-channel sound signal detected by said detecting means for reproducing said sub-carrier to demodulate said sub-channel signal.

14. A television multi-channel sound signal demodulator circuit according to claim 13, wherein said noise component removing means comprises
means provided in said sub-carrier reproducing means for controlling response of said sub-carrier reproducing means to said stereo pilot signal in response to said detected white level.

15. A television multi-channel sound signal demodulator circuit according to claim 14, wherein
said sub-carrier reproducing means comprises
oscillating means for applying an oscillation output of a frequency associated with the frequency of said stereo pilot signal,
means for frequency-dividing said oscillation output,
means for comparing the phases of an output of said frequency-dividing means and said stereo pilot signal to generate an error signal corresponding to the phase difference, thereby to control the oscillation frequency of said oscillating means, and
a low-pass filter having a variable time constant for removing a high frequency component of said error signal, and
said response controlling means comprises means for controlling the time constant of said low-pass filter in response to said detected white level.

16. A television multi-channel sound signal demodulator circuit according to claim 15, wherein
said stereo pilot signal has a frequency equal to the frequency of a horizontal synchronizing signal in said video signal, and
said sub-carrier is set to have a frequency which is twice the frequency of said stereo pilot signal.

17. A television multi-channel sound signal demodulator circuit according to claim 1, wherein said high-pass filter removes a 60 HZ component.

18. A television multi-channel sound signal demodulator circuit comprising:
receiving means for receiving a video signal and a multi-channel sound signal, said multi-channel sound signal comprising at least a main channel signal, an amplitude-modulated sub-channel signal and a stereo pilot signal which are frequency multiplexed;
detecting means for detecting said video signal and multi-channel sound signal which are received by said receiving means;
sub-channel signal demodulating means for demodulating said amplitude-modulated sub-channel signal in the multi-channel sound signal detected by said detecting means;
matrixing means for matrixing said main channel signal in the multi-channel sound signal detected by said detecting means and said sub-channel signal demodulated by said sub-channel signal demodulating means;
noise component removing means for removing a noise component in said demodulated sub-channel signal; and
a white level detecting means for detecting a white level of the video signal detected by said detecting means, wherein said noise component removing means removes a noise component in said demodulated sub-channel signal in response to said detected white level.

19. A television multi-channel sound signal demodulator circuit according to claim 18, wherein said noise component removing means comprises
filtering means inserted between said sub-channel signal demodulating means and said matrixing means and having filter characteristics which change in response to said detected white level.

20. A television multi-channel sound signal demodulator circuit according to claim 19, wherein said filtering means comprises
a filter for removing the noise component in said demodulated sub-channel signal, and
means for mixing said demodulated sub-channel signal and a sub-channel signal obtained by removing the noise component through said filter, in the mixture ratio corresponding to said detected white level.

21. A television multi-channel sound signal demodulator circuit according to claim 19, wherein
said sub-channel signal is amplitude-modulated using a sub-carrier having a frequency associated with the frequency of said stereo pilot signal, and
said sub-channel signal demodulating means comprises means responsive to said stereo pilot signal in the multi-channel sound signal detected by said detecting means for reproducing said sub-carrier to demodulate said sub-channel signal.

22. A television multi-channel sound signal demodulator circuit according to claim 21, wherein said stereo pilot signal has a frequency equal to the frequency of a horizontal synchronizing signal in said video signal, and
said sub-carrier is set to have a frequency which is twice the frequency of said stereo pilot signal.

23. A television multi-channel sound signal demodulator circuit according to claim 22, wherein said filtering means comprises a high-pass filter for removing a 60 HZ component.

24. A television multi-channel sound signal demodulator circuit according to claim 18, wherein said sub-channel signal is amplitude-modulated using a sub-carrier having a frequency associated with the frequency of said stereo pilot signal, said sub-channel signal demodulating means comprises means responsive to said stereo pilot signal in the multi-channel sound signal detected by said detecting means for reproducing said sub-carrier to demodulate said sub-channel signal.

25. A television multi-channel sound signal demodulator circuit according to claim 24, wherein said noise component removing means comprises means provided in said sub-carrier reproducing means for controlling response of said sub-carrier reproducing means to said stereo pilot signal in response to said detected white level.

26. A television multi-channel sound signal demodulator circuit according to claim 25, wherein said sub-carrier reproducing means comprises oscillating means for applying an oscillation output of a frequency associated with the frequency of said stereo pilot signal, means for frequency-dividing said oscillation output, means for comparing the phases of an output of said frequency-dividing means and said stereo pilot signal to generate an error signal corresponding to the phase difference, thereby to control the oscillation frequency of said oscillating means, and a low-pass filter having a variable time constant for removing a high frequency component of said error signal, and said response controlling means comprises means for controlling the time constant of said low-pass filter in response to said detected white level.

27. A television multi-channel sound signal demodulator circuit according to claim 26, wherein said stereo pilot signal has a frequency equal to the frequency of a horizontal synchronizing signal in said video signal, and said sub-carrier is set to have a frequency which is twice the frequency of said stereo pilot signal.

* * * * *

UNITED STATES PATENT AND TRADEMARK OFFICE
CERTIFICATE OF CORRECTION

PATENT NO. : 4,953,021

DATED : August 28, 1990

INVENTOR(S) : ISHIKAWA et al

It is certified that error appears in the above-identified patent and that said Letters Patent is hereby corrected as shown below:

On the cover page, Item [54], "DEMODULATOR CIRCUIT FOR TELEVISION MULTI-CHANNEL" should read --DEMODULATOR CIRCUIT FOR TELEVISION MULTI-CHANNEL SOUND SIGNAL--.

Column 1, lines 2-3, "DEMODULATOR CIRCUIT FOR TELEVISION MULTI-CHANNEL" should read --DEMODULATOR CIRCUIT FOR TELEVISION MULTI-CHANNEL SOUND SIGNAL--.

Signed and Sealed this

Twenty-eighth Day of January, 1992

Attest:

HARRY F. MANBECK, JR.

Attesting Officer

Commissioner of Patents and Trademarks